US011820293B2

(12) United States Patent
Chen et al.

(10) Patent No.: US 11,820,293 B2
(45) Date of Patent: Nov. 21, 2023

(54) VEHICLE AIR VENT CLAMPING DEVICE

(71) Applicant: Dongguan Ruilai Electronic Technology Co., Ltd., Guangdong (CN)

(72) Inventors: Xumian Chen, Shenzhen (CN); Fangtian Wang, Shenzhen (CN); Yucong Qiu, Shenzhen (CN); Guanping Pan, Shenzhen (CN)

(73) Assignee: DONGGUAN RUILAI ELECTRONIC TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/780,524

(22) PCT Filed: Apr. 27, 2020

(86) PCT No.: PCT/CN2020/087118
§ 371 (c)(1),
(2) Date: May 27, 2022

(87) PCT Pub. No.: WO2021/217320
PCT Pub. Date: Nov. 4, 2021

(65) Prior Publication Data
US 2022/0410813 A1    Dec. 29, 2022

(51) Int. Cl.
*B60R 11/02* (2006.01)
*F16B 2/06* (2006.01)
(Continued)

(52) U.S. Cl.
CPC .............. *B60R 11/02* (2013.01); *F16B 2/065* (2013.01); *B60R 2011/0008* (2013.01);
(Continued)

(58) Field of Classification Search
CPC ............ B60R 11/02; B60R 2011/0059; B60R 2011/0008; B60R 2011/089; F16B 2/065; F16B 2/20; F16B 2/12; Y10S 224/929
See application file for complete search history.

(56) References Cited

U.S. PATENT DOCUMENTS 7,857,178 B2 * 12/2010 Brown, Jr. .......... B60R 11/0247
224/547
2005/0236541 A1 * 10/2005 Chang .................... B60R 11/00
248/231.9
(Continued)

FOREIGN PATENT DOCUMENTS

CN      211893068 U  * 11/2020
CN      110065446 B  * 5/2022 ............. B60R 11/02

*Primary Examiner* — Tan Le
(74) *Attorney, Agent, or Firm* — Leong C. Lei

(57) ABSTRACT

A vehicle air vent clamping device is disclosed. The vehicle air vent clamping device includes a base, a supporting arm, a hook for hooking a blade of a vehicle air vent, and an adjustment mechanism for driving the hook to move. The rear end of the supporting arm is connected to the base, and a blocking portion is disposed at the front end of the supporting arm. The hook can be located on the supporting arm in a front-rear movement manner, and when the hook moves to the position of the blocking portion, the hook is hidden in the blocking portion. The adjustment mechanism is connected between the base and the hook.

8 Claims, 9 Drawing Sheets

(51) Int. Cl.
 *B60R 11/00* (2006.01)
 *F16B 2/02* (2006.01)
 *F16B 2/20* (2006.01)

(52) U.S. Cl.
 CPC ........... *B60R 2011/0059* (2013.01); *B60R 2011/0089* (2013.01); *F16B 2/02* (2013.01); *F16B 2/20* (2013.01)

(56) References Cited

U.S. PATENT DOCUMENTS

| | | | | |
|---|---|---|---|---|
| 2008/0224007 A1* | 9/2008 | Mo | ............ | B60R 11/00 248/231.81 |
| 2014/0103087 A1* | 4/2014 | Fan | ............ | B60R 11/02 224/544 |
| 2014/0138419 A1* | 5/2014 | Minn | ............ | F16M 11/105 224/567 |

* cited by examiner

VEHICLE AIR VENT CLAMPING DEVICE

BACKGROUND OF THE INVENTION

1. Field of the Invention

The present invention relates to vehicle-mounted supplies, and more particularly to a vehicle air vent clamping device.

2. Description of the Prior Art

With the development of technology, there are more and more cars driving on the road. For the needs of navigation, the car owner may install a mobile phone holder in his/her car. The mobile phone holder is generally clamped on the blade of the car air vent through an air vent clip. However, the conventional air vent clips are easily loosened and displaced or even fall off due to vibration, resulting in damage to the electronic product, such as a mobile phone placed on the holder.

There is an improved air vent clip on the market. This kind of air vent clip has a hook. When the air vent clip is attached to the air vent, the position of the hook is adjusted for connecting the hook with the rear end of the blade of the air vent, so as to realize the connection of the air vent clip. However, the conventional hook is exposed and disposed on the air vent clip. When the air vent clip is to be separated from the air vent, it is necessary to pull the hook and then remove the air vent clip. The operation is troublesome, the use is inconvenient, and the practicability is poor. Therefore, it is necessary to study a new technical solution to solve the above problems.

SUMMARY OF THE INVENTION

In view of the deficiencies of the prior art, the primary object of the present invention is to provide a vehicle air vent clamping device. Through the blocking portion disposed on the supporting arm, the clamping device hides the hook before it is plugged to the blade of the vehicle air vent. Thus, the hook won't be scraped and collided with the blade of the vehicle air vent, so that the clamping device can be directly plugged to the vehicle air vent. The operation is quick and easy.

In order to achieve the above object, the present invention adopts the following technical solutions.

A vehicle air vent clamping device comprises a base, a supporting arm, a hook for hooking a blade of a vehicle air vent, and an adjustment mechanism for driving the hook to move. A rear end of the supporting arm is connected to the base. A front end of the supporting arm has a blocking portion. The hook is located on the supporting arm and is movable back and forth. When the hook is moved to the blocking portion, the hook is hidden in the blocking portion. The adjustment mechanism is connected between the base and the hook.

Preferably, the base includes a clip. A deformable clip slot is defined between the clip and the supporting arm. A front end of the clip has a guide slope extending obliquely in a direction away from the supporting arm. A guide opening is defined between the guide slope and the blocking portion. The guide opening is opened when the vehicle air vent clamping device is slidably fitted to the blade of the vehicle air vent.

Preferably, the adjustment mechanism includes a screw rod and a rotating wheel. The supporting arm has an accommodating groove for accommodating the screw rod. The screw rod is rotatably located in the accommodating groove. The screw rod passes through the hook. The hook is movable back and forth along with rotation of the screw rod. A gear is connected to a rear end of the screw rod. The rotating wheel is rotatably mounted to the base. An inner wall of the rotating wheel has a toothed ring. The toothed ring meshes with the gear.

Preferably, the blocking portion includes side plates disposed on two side walls of the front end of the supporting arm. A receiving groove is defined between the two side plates. The receiving groove communicates with the accommodating groove. When the hook is moved to the blocking portion, the hook is hidden in the receiving groove.

Preferably, the front end of the supporting arm has a restricting portion for preventing the hook from moving away from the supporting arm. A front end of the screw rod is rotatably mounted to the restricting portion.

Preferably, a rear end of the blocking portion has a guide incline for the vehicle air vent clamping device to be removed from the blade of the vehicle air vent with ease.

Preferably, a locking mechanism for locking the rotating wheel is disposed between the rotating wheel and the base. The locking mechanism includes a push unit and a plurality of locking teeth around the inner wall of the rotating wheel. The push unit includes a push member and an elastic member. A restricting groove is defined in the base. The push member is movable up and down and mounted in the restricting groove. An upper end of the restricting groove has a notch. An upper end of the push member has a push portion. The push portion extends outward from the notch and is elastically engaged with the locking teeth.

Preferably, a connecting pin is disposed in a central portion of the base. The rotating wheel is rotatably mounted to the connecting pin. A rear end of the connecting pin extends out of the rotating wheel. A universal ball is connected to the rear end of the connecting pin.

Preferably, when the hook is moved to the blocking portion, a lower edge of a rear end of the hook does not extend beyond a lower edge of the blocking portion.

Preferably, an outer wall of the rotating wheel has two lugs for holding and driving the rotating wheel to rotate.

Compared with the prior art, the present invention has obvious advantages and beneficial effects. Specifically, it can be seen from the above technical solutions that through the design of the blocking portion, the vehicle air vent clamping device can be directly plugged for use.

When the vehicle air vent clamping device is to be plugged for use, the contact surface of the blocking portion is slid and inserted along the blade of the vehicle air vent. This can reduce the squeeze force of the blade of the vehicle air vent on the hook and reduce the risk of damage to the hook caused by multiple squeezes. When the vehicle air vent clamping device is to be unplugged, there is no need to pull the hook as the prior art. The operation is simple and more practical.

Embodiments of the present invention will now be described, by way of example only, with reference to the accompanying drawings.

DETAILED DESCRIPTION OF THE PREFERRED EMBODIMENTS

Figure 1:
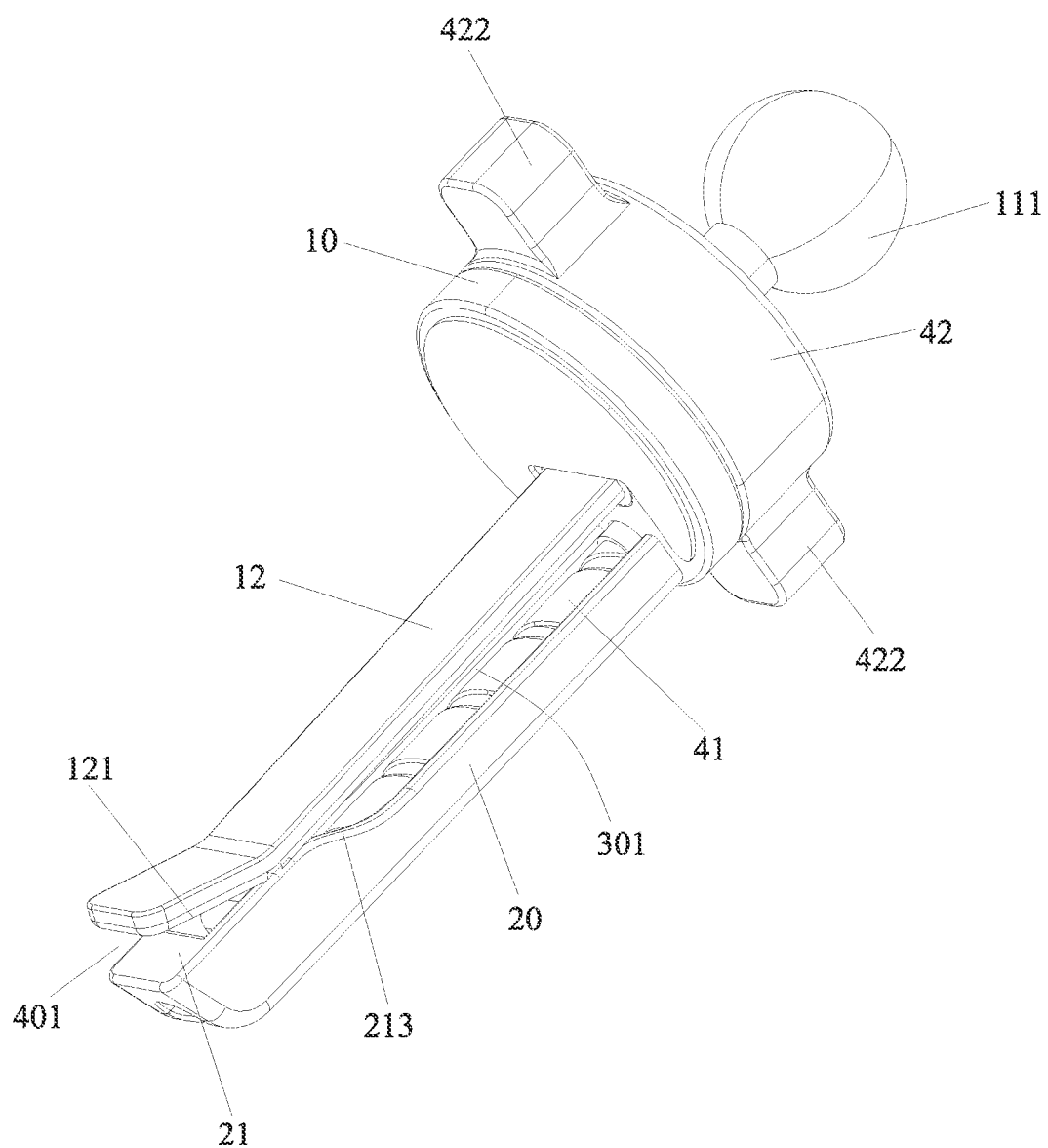
FIG. 1 is a perspective view of a clamping device according to a first embodiment of the present invention.
Figure 2:
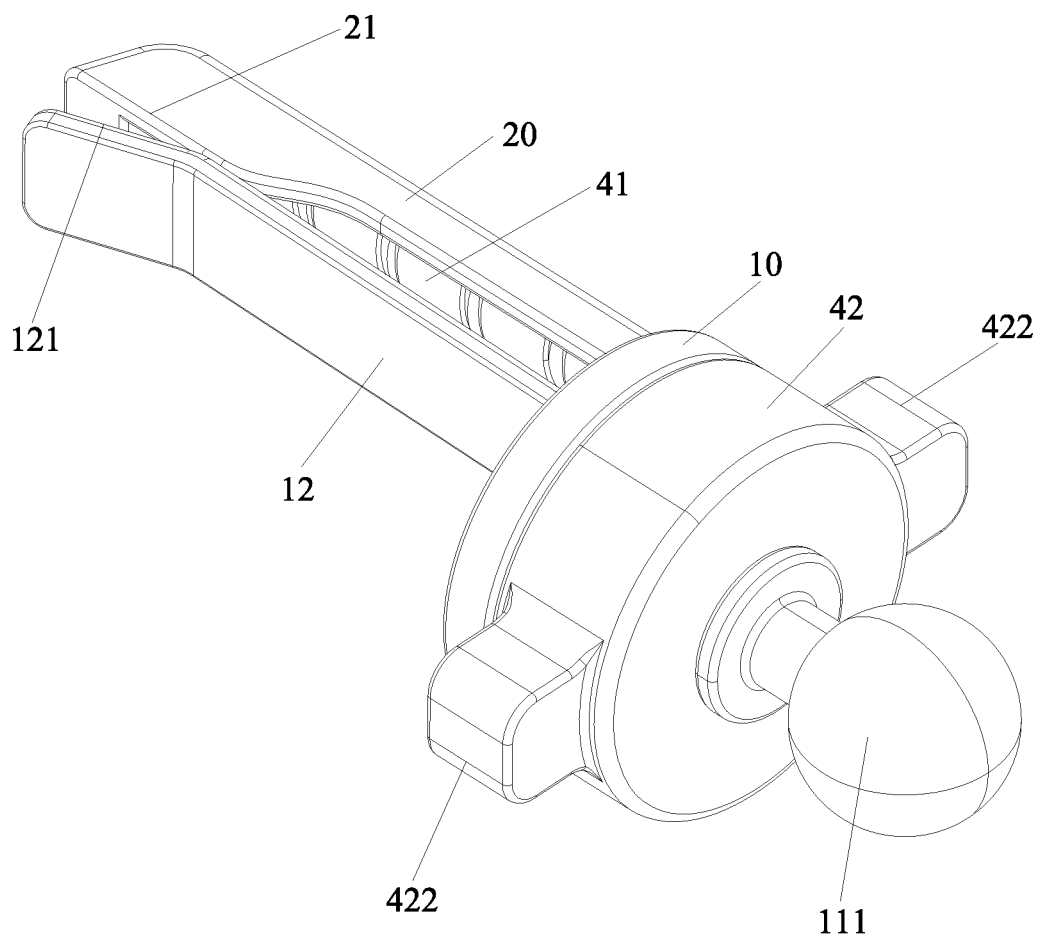
FIG. 2 is another perspective view of the clamping device according to the first embodiment of the present invention.
Figure 3:
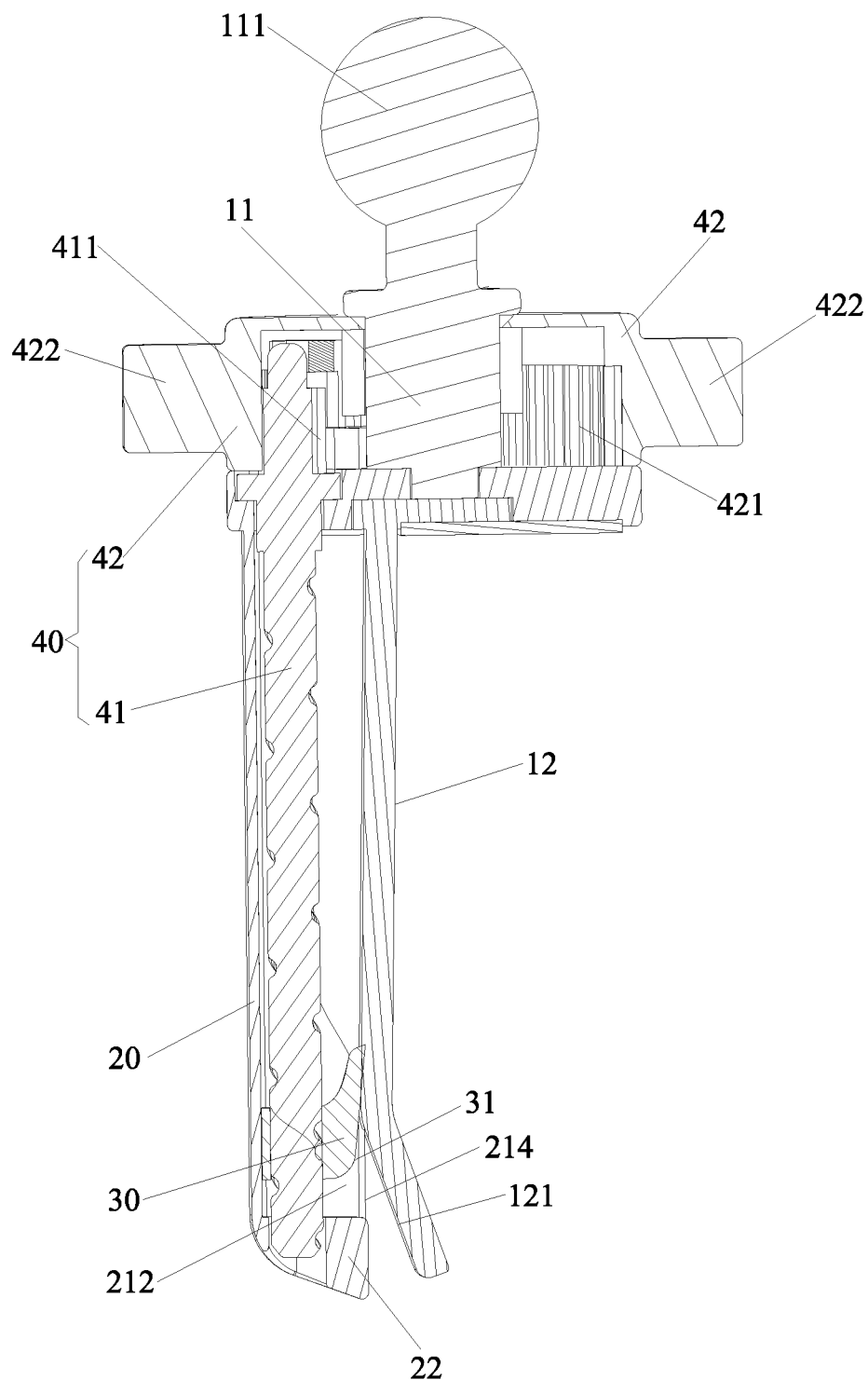
FIG. 3 is a cross-sectional view of the clamping device according to the first embodiment of the present invention.
Figure 4:
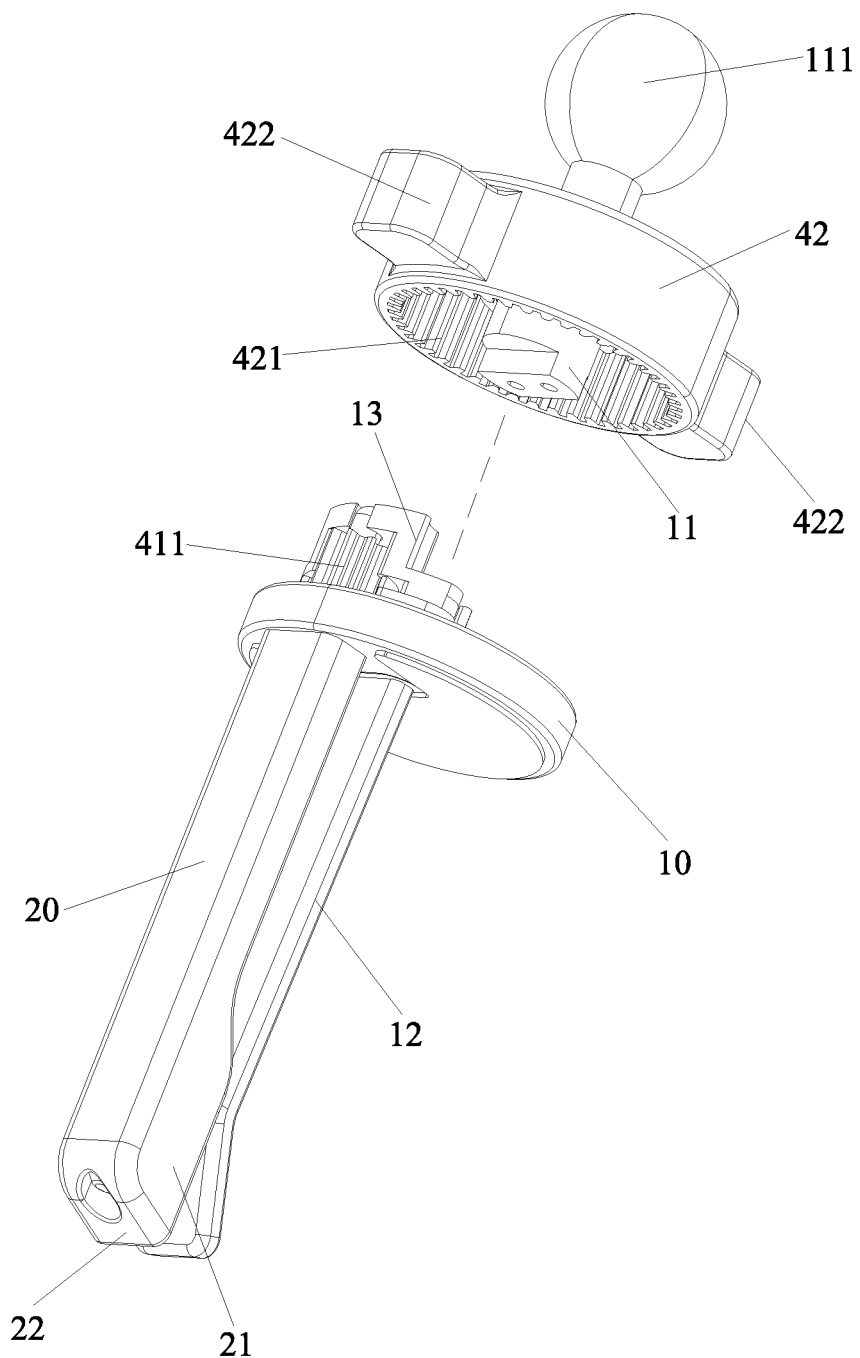
FIG. 4 is an exploded view of the clamping device according to the first embodiment of the present invention.
Figure 5:
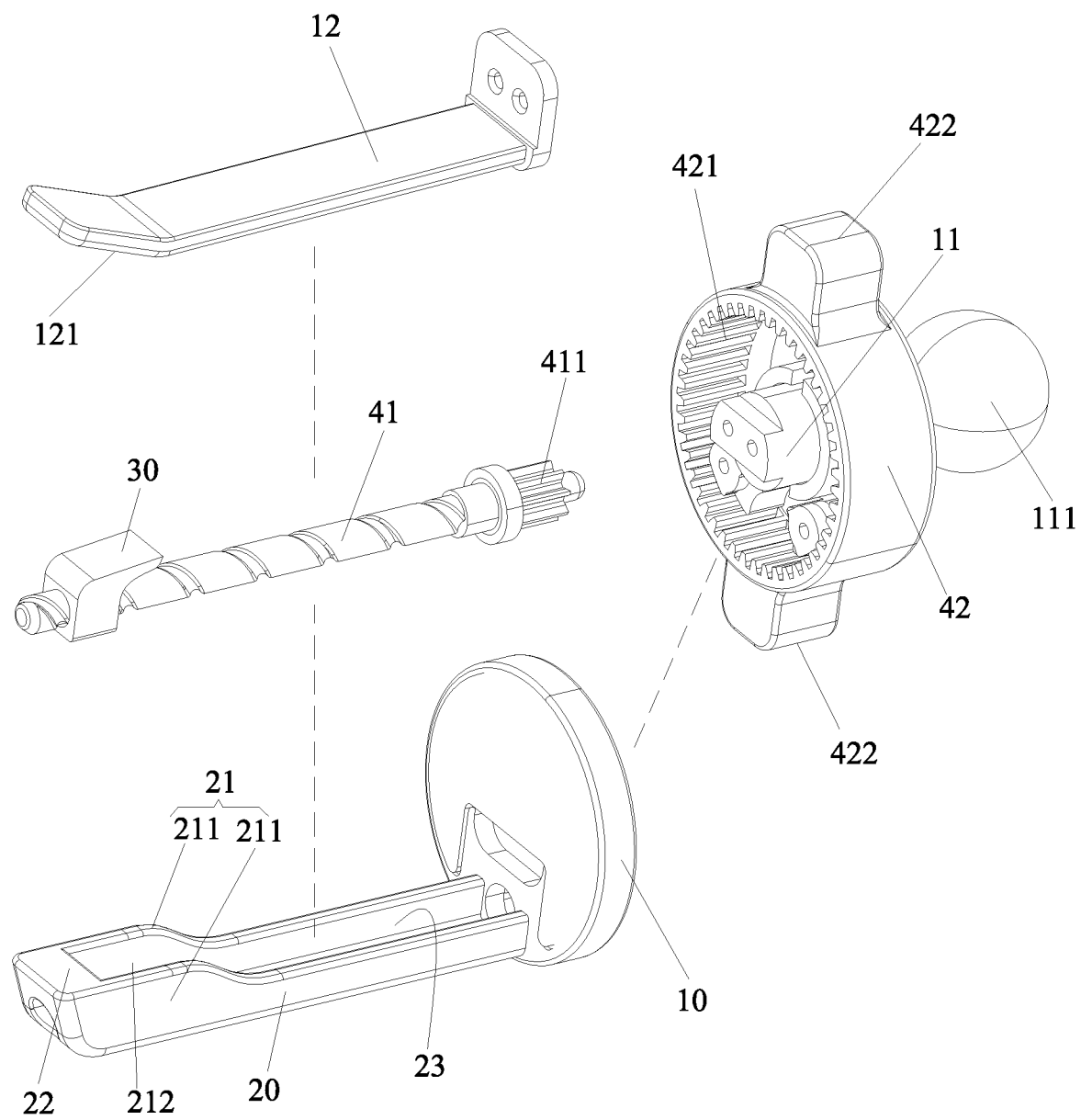
FIG. 5 is a further exploded view of the clamping device according to the first embodiment of the present invention.
Figure 6:
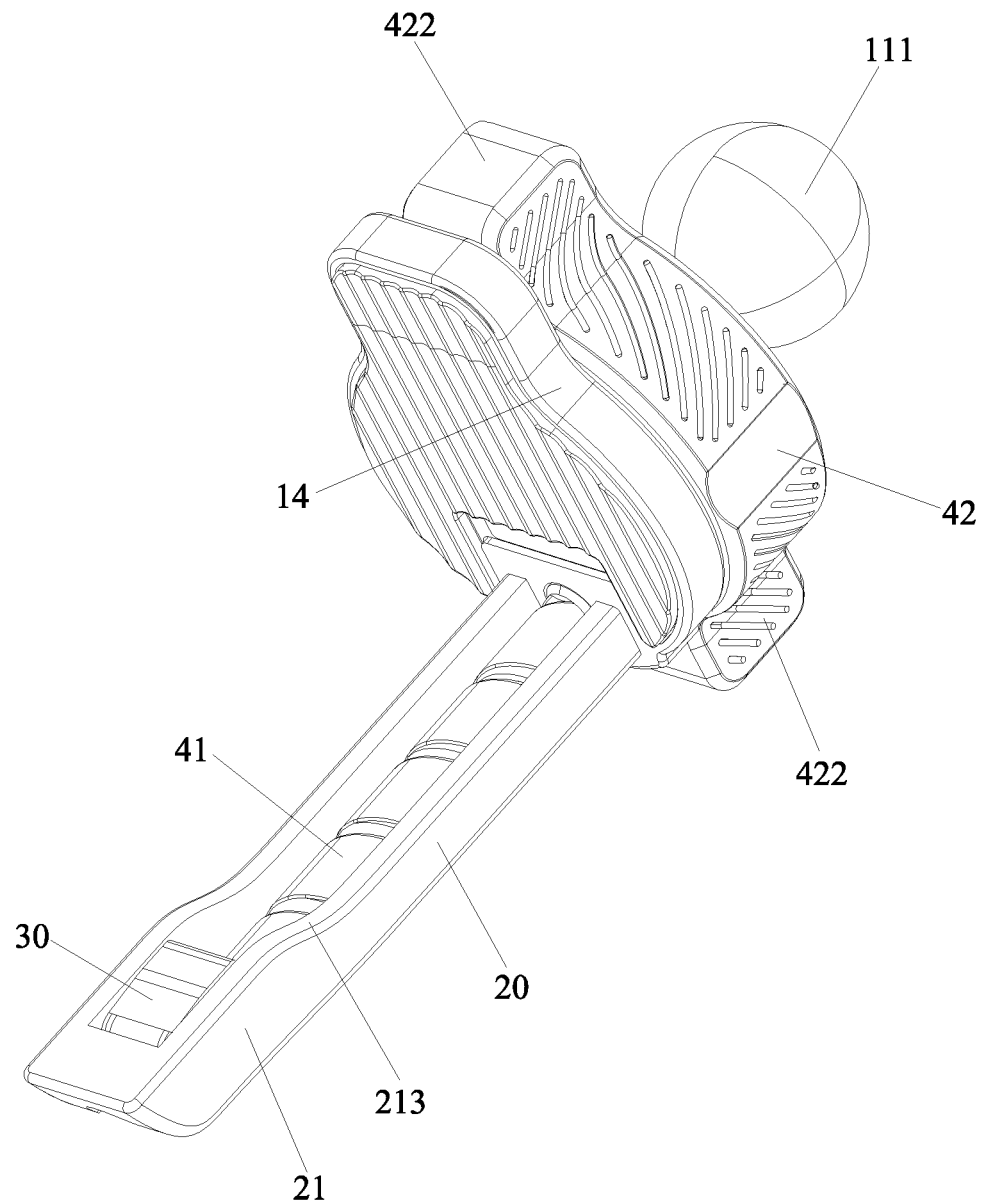
FIG. 6 is a perspective view of a clamping device according to a second embodiment of the present invention.
Figure 7:
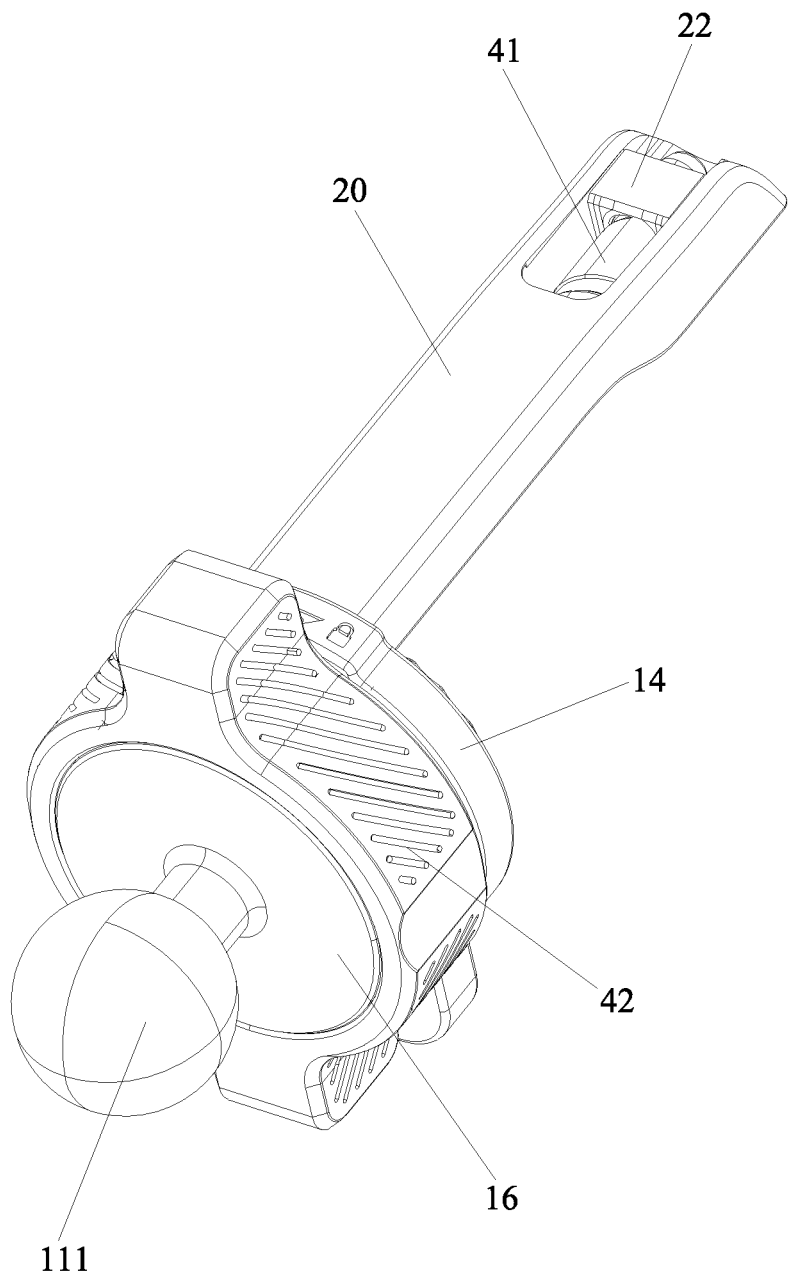
FIG. 7 is another perspective view of the clamping device according to the second embodiment of the present invention.
Figure 8:
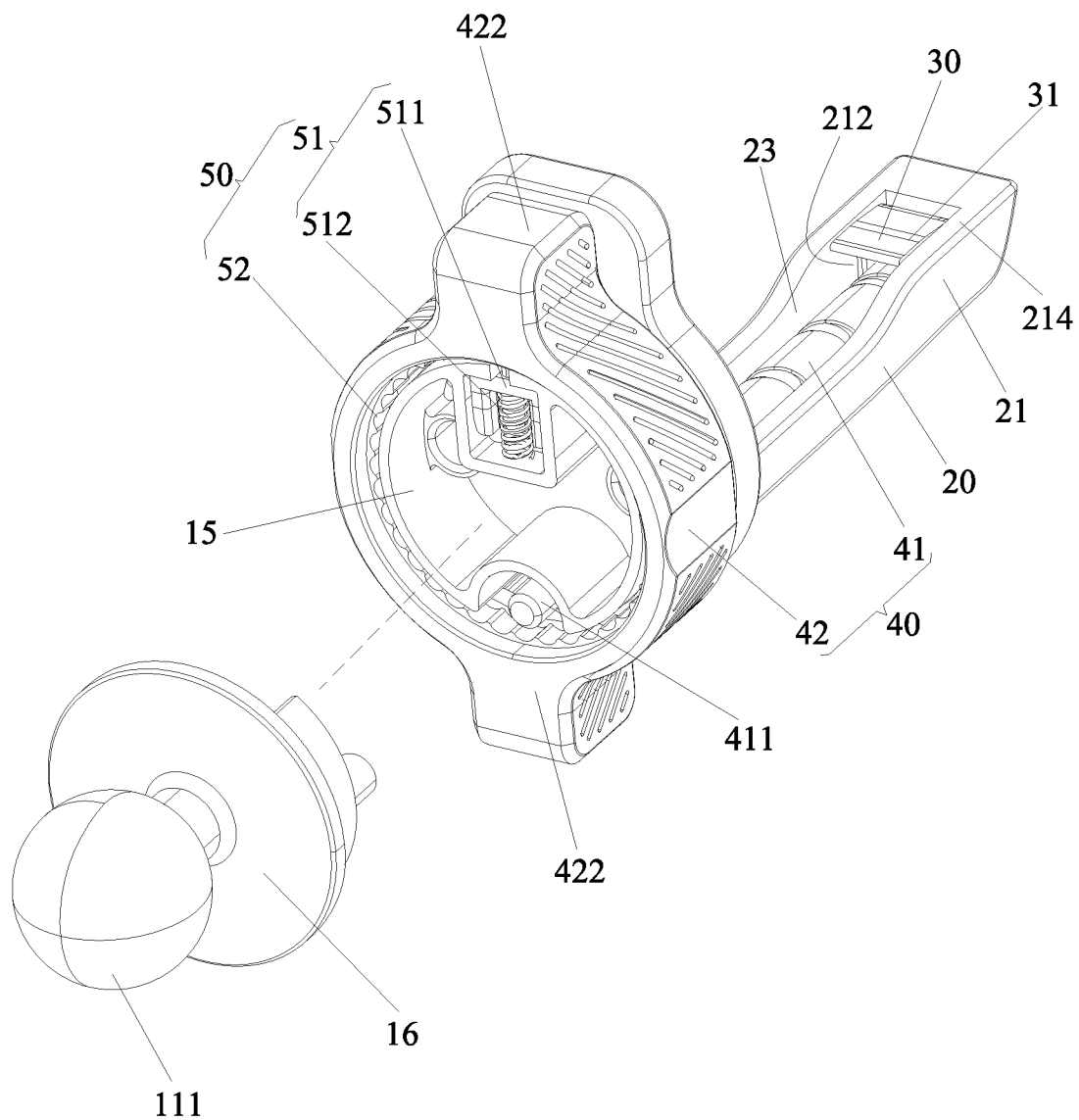
FIG. 8 is an exploded view of the clamping device according to the second embodiment of the present invention.
Figure 9:
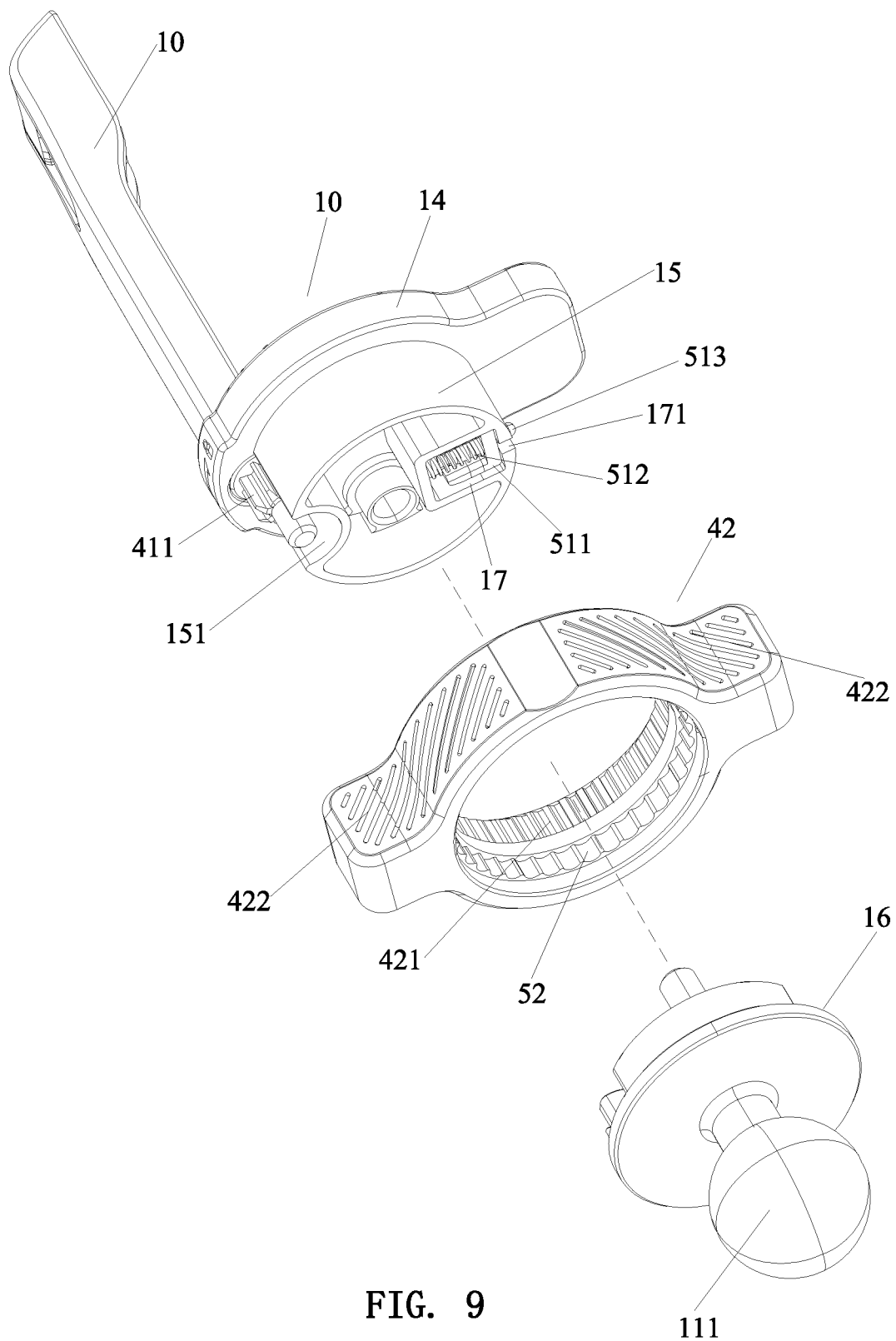
FIG. 9 is a further exploded view of the clamping device according to the second embodiment of the present invention.

As shown in FIG. 1 through FIG. 9, a vehicle air vent clamping device comprises a base 10, a supporting arm 20, a hook 30 for hooking a blade of a vehicle air vent, and an adjustment mechanism 40 for driving the hook 30 to move.

In a first embodiment of the present invention, as shown in FIGS. 1-5, a connecting pin 11 is disposed in the center of the base 10. A universal ball 111 is disposed at the rear end of the connecting pin 11.

The rear end of the supporting arm 20 is integrally connected to the base 10. A clip 12 is detachably connected to the base 10 along the direction of the supporting arm 20. The front end of the supporting arm 20 has a blocking portion 21 facing the clip 12 for shielding the hook 30. A deformable clip slot 301 is defined between the clip 12 and the supporting arm 20. The front end of the clip 12 has a guide slope 121 extending obliquely in a direction away from the supporting arm 20. A guide opening 401 is defined between the guide slope 121 and the blocking portion 21. The guide opening 401 is opened when the vehicle air vent clamping device is slidably fitted to the blade of the vehicle air vent, so that the vehicle air vent clamping device can be plugged and connected to the blade with ease. Through the blocking portion 21 disposed on the supporting arm 20, when the supporting arm 20 and the clip 12 are separated from the vehicle air vent, the rear end of the blocking portion 21 is in contact with the blade of the vehicle air vent, thereby preventing the hook 30 from contacting the blade of the vehicle air vent again to be restricted. The structure is simple, the design is ingenious and reasonable, and the operation is easy.

The hook 30 is located on the supporting arm 20 and is movable back and forth.

The adjustment mechanism 40 includes a screw rod 41 and a rotating wheel 42. The screw rod 41 is rotatably located between the supporting arm 20 and the base 10. The screw rod 41 passes through the hook 30. The hook 30 is moved back and forth along with rotation of the screw rod 41. When the hook 30 is moved to the blocking portion 21, the hook 30 is hidden in the blocking portion 21. This can prevent the hook 30 from being exposed to the outside of the supporting arm 20 and colliding with other components to cause damage. The practicability and stability are better. A lower edge 31 of the rear end of the hook 30 does not extend beyond a lower edge 214 of the blocking portion 21, so as to prevent the hook 30 from hindering the action when the vehicle air vent clamping device is plugged and connected to the blade of the vehicle air vent. The front end of the supporting arm 20 has a restricting portion 22 for preventing the hook 30 from moving away from the supporting arm 20. The front end of the screw rod 41 is rotatably mounted to the restricting portion 22. A gear 411 is connected to the rear end of the screw rod 41. A retaining seat 13 is disposed on the base 10. The gear 411 is mounted to the retaining seat 13 and connected to the rear end of the screw rod 41. The rotating wheel 42 is rotatably mounted to the connecting pin 11 of the base 10. The rear end of the connecting pin 11 extends out of the rotating wheel 42. The universal ball 111 is mounted to the end of the connecting pin 11, extending out of the rotating wheel 42. The inner wall of the rotating wheel 42 has a toothed ring 421 corresponding to the gear 411. The toothed ring 421 meshes with the gear 411. The number of teeth of the toothed ring 421 is several times the number of teeth of the gear 411. When the toothed ring 421 is driven by the rotating wheel 42 to turn a circle, the gear 411 is driven to turn multiple circles, so that the screw rod 41 is rotated rapidly to drive the hook 30 to move quickly, so as to achieve a speed change effect and realize the rapid locking or unlocking of the hook 30. The outer wall of the rotating wheel 42 has two lugs 422 for holding and driving the rotating wheel 42 to rotate. The two lugs 422 are arranged symmetrically.

Specifically, the blocking portion 21 includes side plates 211 disposed on two side walls of the front end of the supporting arm 20. A receiving groove 212 is defined between the two side plates 211. When the hook 30 is moved to the blocking portion 21, the hook 30 is hidden in the receiving groove 212. The overall appearance of the vehicle air vent clamping device is pleasing to the eyes and beautiful, and the practicability is strong. The restricting portion 22 is integrally connected to the two side plates 211 to form a three-sided enclosure. The rear end of the blocking portion 21 has a guide incline 213 for the vehicle air vent clamping device to be removed from the blade of the vehicle air vent with ease. The supporting arm 20 has an accommodating groove 23 extending in the installation direction of the screw rod 41 for accommodating the screw rod 41. The screw rod 41 is located in the accommodating groove 23. The accommodating groove 23 communicates with the receiving groove 212. The hook 30 is moved in the receiving groove 212 and the accommodating grooves 23.

The use of the vehicle air vent clamping device is described below. Before the vehicle air vent clamping device is plugged and connected to the blade of the vehicle air vent, the rotating wheel 42 is rotated first. Through the cooperation of the toothed ring 421 and the gear 411, the screw rod 41 is driven to rotate, so that the hook 30 is moved to the blocking portion 21. Then, the guide opening 401 is insertedly connected to the corresponding blade of the vehicle air vent. The rotating wheel 42 is rotated again to move the hook 30 in the opposite direction against the end of the blade of the vehicle air vent, such that the vehicle air vent clamping device is secured on the blade of the vehicle air vent.

In a second embodiment of the present invention, as shown in FIGS. 6-9, the second embodiment is on the basis of the first embodiment, without the clip 12. The hook 30 and the adjustment mechanism 40 are the same as in the first embodiment. In the second embodiment, the base 10 includes a base plate 14, a protruding ring 15 integrally connected to the rear side wall of the base plate 14, and an end cap 16 covering the outer side of the protruding ring 15. The rotating wheel 42 is rotatably mounted on the protruding ring 15. The end cap 16 is mounted to the end of the protruding ring 15 to block the outer side of the rotating wheel 42, so as to prevent the rotating wheel 42 from coming out. The universal ball 111 is disposed on the outer side wall of the end cover 16. The protruding ring 15 has a recess 151 corresponding in position to the gear 411. The gear 411 is rotatably located in the recess 151.

In the first embodiment and the second embodiment, a locking mechanism 50 for locking the rotating wheel 42 is disposed between the rotating wheel 42 and the base 10. The locking mechanism 50 includes a push unit 51 and a plurality of locking teeth 52 around the inner wall of the rotating wheel 42. The push unit 51 includes a push member 511 and an elastic member 512. A restricting groove 17 is defined in the base 10. The push member 511 is movable up and down and mounted in the restricting groove 17. The upper end of the restricting groove 17 has a notch 171. The upper end of the push member 511 has a push portion 513. The push portion 513 extends outward from the notch 171 and is elastically engaged with the locking teeth 52. When the rotating wheel 42 is rotated manually, the push portion 513 is in rolling contact with the plurality of locking teeth 52 to generate a clicking sound, which improves the quality of the product and enhancing the experience and fun of use. When the rotating wheel 42 stops rotating, the push portion 513 is elastically engaged between adjacent two of the locking teeth 52 under the elastic force of the elastic member 512, so as to restrict rotation of the rotating wheel 42.

It should be noted that the structure and principle of the locking mechanism 50 in the first embodiment and the second embodiment are the same. Therefore, the locking mechanism 50 is only shown in the drawings corresponding to the second embodiment, not shown in the drawings corresponding to the first embodiment.

The feature of the present invention is that, through the design of the blocking portion, the vehicle air vent clamping device can be directly plugged for use. When the vehicle air vent clamping device is to be plugged for use, the contact surface of the blocking portion is slid and inserted along the blade of the vehicle air vent. This can reduce the squeeze force of the blade of the vehicle air vent on the hook and reduce the risk of damage to the hook caused by multiple squeezes. When the vehicle air vent clamping device is to be unplugged, there is no need to pull the hook as the prior art. The operation is simple and more practical.

Secondly, the hook is hidden in the blocking portion, which avoids the hook from being exposed to the outside and colliding with other objects to cause damage. The practicability and stability are better. In particular, the hook is hidden in the receiving groove. When the vehicle air vent clamping device is to be plugged for use, the stress on the contact surfaces of the two side plates is more balanced. The operation is smoother, and the shielding protection of the hook is more comprehensive. In addition, the overall shape and structure of the vehicle air vent clamping device is simple and compact. The assembly and disassembly are easy.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A vehicle air vent clamping device, comprising a base, a supporting arm, a hook for hooking a blade of a vehicle air vent, and an adjustment mechanism for driving the hook to move, a rear end of the supporting arm being connected to the base, a front end of the supporting arm having a blocking portion; the hook being located on the supporting arm and being movable back and forth, wherein when the hook is moved to the blocking portion, the hook is hidden in the blocking portion; the adjustment mechanism being connected between the base and the hook; wherein the adjustment mechanism includes a screw rod and a rotating wheel, the supporting arm has an accommodating groove for accommodating the screw rod, the screw rod is rotatably located in the accommodating groove, the screw rod passes through the hook, the hook is movable back and forth along with rotation of the screw rod, a gear is connected to a rear end of the screw rod; the rotating wheel is rotatably mounted to the base, an inner wall of the rotating wheel has a toothed ring, and the toothed ring meshes with the gear; and, wherein a locking mechanism for locking the rotating wheel is disposed between the rotating wheel and the base, the locking mechanism includes a push unit and a plurality of locking teeth around the inner wall of the rotating wheel, the push unit includes a push member and an elastic member, a restricting groove is defined in the base, the push member is movable up and down and mounted in the restricting groove, an upper end of the restricting groove has a notch, an upper end of the push member has a push portion, and the push portion extends outward from the notch and is elastically engaged with the locking teeth.

2. The vehicle air vent clamping device as claimed in claim 1, wherein the base includes a clip, a deformable clip slot is defined between the clip and the supporting arm; a front end of the clip has a guide slope extending obliquely in a direction away from the supporting arm, a guide opening is defined between the guide slope and the blocking portion, and the guide opening is opened when the vehicle air vent clamping device is slidably fitted to the blade of the vehicle air vent.

3. The vehicle air vent clamping device as claimed in claim 1, wherein the blocking portion includes side plates disposed on two side walls of the front end of the supporting arm, a receiving groove is defined between the two side plates, the receiving groove communicates with the accommodating groove; when the hook is moved to the blocking portion, the hook is hidden in the receiving groove.

4. The vehicle air vent clamping device as claimed in claim 1, wherein the front end of the supporting arm has a restricting portion for preventing the hook from moving away from the supporting arm, and a front end of the screw rod is rotatably mounted to the restricting portion.

5. The vehicle air vent clamping device as claimed in claim 1, wherein a rear end of the blocking portion has a guide incline for the vehicle air vent clamping device to be removed from the blade of the vehicle air vent with ease.

6. The vehicle air vent clamping device as claimed in claim 1, wherein a connecting pin is disposed in a central portion of the base, the rotating wheel is rotatably mounted to the connecting pin, a rear end of the connecting pin extends out of the rotating wheel, and a universal ball is connected to the rear end of the connecting pin.

7. The vehicle air vent clamping device as claimed in claim 1, wherein when the hook is moved to the blocking portion, a lower edge of a rear end of the hook does not extend beyond a lower edge of the blocking portion.

8. The vehicle air vent clamping device as claimed in claim 1, wherein an outer wall of the rotating wheel has two lugs for holding and driving the rotating wheel to rotate.

* * * * *